US010225693B2

(12) United States Patent
Kodan et al.

(10) Patent No.: US 10,225,693 B2
(45) Date of Patent: Mar. 5, 2019

(54) WIRELESS COMMUNICATION DEVICE MOUNTABLE ON MOBILE OBJECT, MONITORING CONTROL SYSTEM OF WIRELESS COMMUNICATION DEVICE MOUNTABLE ON MOBILE OBJECT, MONITORING CONTROL METHOD OF WIRELESS COMMUNICATION DEVICE MOUNTABLE ON MOBILE OBJECT, AND REMOTE CONTROL CENTER

(71) Applicant: Toyota Jidosha Kabushiki Kaisha, Toyota-shi, Aichi-ken (JP)

(72) Inventors: Tomoki Kodan, Beijing (CN); Xing Wei, Beijing (CN); Dan Jang, Beijing (CN); Yasuhisa Fujiwara, Toyota (JP); Yanjun Shang, Beijing (CN)

(73) Assignees: Toyota Jidosha Kabushiki Kaisha, Toyota-shi (JP); Toyota Motor (China) Investment Co., Ltd., Beijing (CN)

( * ) Notice: Subject to any disclaimer, the term of this patent is extended or adjusted under 35 U.S.C. 154(b) by 0 days.

(21) Appl. No.: 15/826,130

(22) Filed: Nov. 29, 2017

(65) Prior Publication Data
US 2018/0091945 A1 Mar. 29, 2018

Related U.S. Application Data (63) Continuation of application No. 14/870,498, filed on Sep. 30, 2015, now Pat. No. 9,867,002.

(30) Foreign Application Priority Data

Sep. 30, 2014 (CN) .......................... 2014 1 0522122

(51) Int. Cl.
*H04W 4/00* (2018.01)
*H04W 4/02* (2018.01)
(Continued)

(52) U.S. Cl.
CPC ............. *H04W 4/023* (2013.01); *G01S 19/42* (2013.01); *H04L 67/18* (2013.01); *H04W 4/025* (2013.01);
(Continued)

(58) Field of Classification Search
CPC combination set(s) only.
See application file for complete search history.

(56) References Cited

U.S. PATENT DOCUMENTS 9,014,160 B2   4/2015 Moeller
9,671,233 B2 * 6/2017 Holden ................. G01C 21/30
(Continued)

FOREIGN PATENT DOCUMENTS

EP   2753129 A1   7/2014
JP   2002-168633 A   6/2002
(Continued)

OTHER PUBLICATIONS

U.S. Appl. No. 14/870,498, filed Sep. 30, 2015, Tomoki Kodan et al.

*Primary Examiner* — Khai M Nguyen
(74) *Attorney, Agent, or Firm* — Dinsmore & Shohl LLP (57) ABSTRACT

A wireless communication device mounted on a mobile object, the mobile object including: a mobile communication unit that is able to connect to a mobile communication network; and a wireless network connection unit that provides a wireless network connection service based on the mobile communication network connected by the mobile communication unit, the wireless communication device includes: a satellite positioning unit configured to acquire position information on the wireless communication device based on a satellite positioning system; and a control unit configured to control a connection state of the wireless
(Continued)

network connection service based on the position information acquired by the satellite positioning unit.

9 Claims, 9 Drawing Sheets

(51) Int. Cl.
    *H04W 48/04*     (2009.01)
    *G01S 19/42*     (2010.01)
    *H04W 12/08*     (2009.01)
    *H04W 4/04*     (2009.01)
    *H04L 29/08*     (2006.01)
    *H04W 12/12*     (2009.01)

(52) U.S. Cl.
    CPC ........... *H04W 4/027* (2013.01); *H04W 4/046* (2013.01); *H04W 12/08* (2013.01); *H04W 48/04* (2013.01); *H04L 67/12* (2013.01); *H04W 12/12* (2013.01)

(56) References Cited

U.S. PATENT DOCUMENTS

| | | | |
|---|---|---|---|
| 10,057,874 B2* | 8/2018 | Terao | .................... H04W 48/20 |
| 2003/0098802 A1 | 5/2003 | Jones | |
| 2004/0082341 A1 | 4/2004 | Stanforth | |
| 2009/0209282 A1 | 8/2009 | Kobayashi et al. | |
| 2009/0291641 A1* | 11/2009 | Sato | .................. H04M 1/72522 455/67.11 |
| 2009/0306834 A1 | 12/2009 | Hjelm et al. | |
| 2010/0223006 A1* | 9/2010 | Sasaki | .................... G01C 21/26 701/533 |
| 2010/0299207 A1 | 11/2010 | Harlev et al. | |
| 2011/0060600 A1 | 3/2011 | Fox et al. | |
| 2012/0327922 A1* | 12/2012 | Takahashi | ............. G01S 5/0263 370/338 |
| 2012/0329480 A1* | 12/2012 | Hashimoto | ............. G01S 19/34 455/456.1 |
| 2013/0072224 A1* | 3/2013 | Oda | ....................... G01S 19/14 455/456.1 |
| 2013/0176869 A1 | 7/2013 | Finlow-Bates et al. | |
| 2015/0061895 A1 | 3/2015 | Ricci | |

FOREIGN PATENT DOCUMENTS

| | | |
|---|---|---|
| JP | 2009-281927 A | 12/2009 |
| JP | 2010-169570 A | 8/2010 |
| JP | 2014-075715 A | 4/2014 |
| WO | 2010144818 A1 | 12/2010 |
| WO | 2013181310 A2 | 12/2013 |

\* cited by examiner

WIRELESS COMMUNICATION DEVICE MOUNTABLE ON MOBILE OBJECT, MONITORING CONTROL SYSTEM OF WIRELESS COMMUNICATION DEVICE MOUNTABLE ON MOBILE OBJECT, MONITORING CONTROL METHOD OF WIRELESS COMMUNICATION DEVICE MOUNTABLE ON MOBILE OBJECT, AND REMOTE CONTROL CENTER

CROSS-REFERENCE TO RELATED APPLICATIONS

This application is a continuation of U.S. patent application Ser. No. 14/870,498 filed Sep. 30, 2015 which claims priority to Chinese Patent Application No. 201410522122.7 filed on Sep. 30, 2014, both of which are incorporated herein by reference in their entirety.

BACKGROUND

1. Technical Field

The present disclosure relates to a wireless communication device mountable on a mobile object and, mere particularly, to a wireless communication device mountable on a mobile object capable of monitoring and controlling whether the wireless communication device is taken out from the mobile object for use by the user, a monitoring control system of a wireless communication device mountable on a mobile object, a monitoring control method of a wireless communication device mountable on a mobile Object, and a remote control center.

2. Description of Related Art

Widespread use of the Internet technology makes it possible for more and more mobile terminals to have the ability to access the mobile internet. A wireless router that provides a mobile hotspot is commercially available today. This wireless router sets up a WiFi wireless network access point based on a Subscriber Identity Module (SIM) card, provided by a mobile network operator for access to the Internet, thus providing the WiFi wireless network access service to the nearby mobile terminals. An example of such a mobile wireless router is a MiFi device. MiFi, a portable device, sets up a WiFi wireless network access service to allow a plurality of nearby mobile terminals to share 3G or 4G mobile communication Internet connections. MiFi, originally the trademark registered by Novatel Wireless for this type of device, today generally refers to a wireless router that acts as this type of mobile hotspot. Today, a smartphone has the mobile hotspot function in many cases to give other nearby mobile terminals an access to the WiFi wireless network. For example, Applet's iPhone Settings screen has the 'Personal Hotspot' function.

With the advent of the smart Telematics system, many car manufacturers have started having some models of their vehicles equipped with a wireless communication device, with a similar wireless router function, to start a similar service. This wireless communication device allows an occupant's mobile terminal to access the wireless Internet and allows other in-vehicle devices, which require wireless network access services, to connect to the Internet by accessing the wireless network. In addition, this wireless communication device enables communication with the remote control center of the smart Telematics system.

SUMMARY

When providing an in-vehicle wireless router, a car manufacturer usually gives the user a predetermined amount of free Internet work traffic on a monthly basis to support the smart Telematics system. This means that there is a possibility that some users will remove and take out the in-vehicle wireless router from the vehicle for enjoying free Internet access at home or in other places. With general considerations for safety and other factors, car manufacturers desire, in general, that the in-vehicle wireless communication device with the wireless router function he used in the vehicle only but not be taken out freely for use outside the vehicle. However, a conventional wireless communication device cannot monitor and control whether the device is taken out from the vehicle for use outside the vehicle.

A wireless communication device according to a first aspect of the present disclosure is a wireless communication device mounted on a mobile object, the mobile object including: a mobile communication unit that is able to connect to a mobile communication network; and a wireless network connection unit that provides a wireless network connection service based on the mobile communication network connected by the mobile communication unit. The wireless communication device includes a satellite positioning unit configured to acquire position information on the wireless communication device based on a satellite positioning system; and a control unit configured to control a connection state of the wireless network connection service based on the position information acquired by the satellite positioning unit.

A wireless communication device according to a second aspect of the present disclosure is a wireless communication device mountable on a mobile object, the mobile object including: a mobile communication unit that is able to connect to a mobile communication network; and a wireless network connection unit that provides a wireless network connection service based on the mobile communication network connected by the mobile communication unit. The wireless communication device includes a satellite positioning unit configured to acquire position information on the wireless communication device based on a satellite positioning system; and an information providing unit configured to provide information corresponding to a determination result to a user, the determination result being determined based on the position information acquired by the satellite positioning unit, the determination result indicating whether the wireless communication device is taken out for use outside the mobile object.

A remote control center according to a third aspect of the present disclosure is a remote control center that is able to communicate with a wireless communication device mountable on a mobile object. The remote control center includes a receiving unit configured to receive position information on the wireless communication device sent from the wireless communication device; a center-side determination unit configured to determine whether the wireless communication device is used outside the mobile object based on the position information on the wireless communication device received by the receiving unit; and a sending unit configured to send a signal according to a determination result of the center-side determination unit to the wireless communication device.

A monitoring control system for a wireless communication device according to a fourth aspect of the present disclosure is a monitoring control system for a wireless communication device mountable on a mobile object the mobile object including: a mobile communication unit that is able to connect to a mobile communication network; and a wireless network connection unit that provides a wireless network connection service based on the mobile communication network connected by the mobile communication unit. The monitoring control system includes a satellite positioning unit configured to acquire position information on the wireless communication device based on a satellite positioning system; and a determination unit configured to determine whether the wireless communication device is taken out for use outside the mobile object based on the position information acquired by the satellite positioning unit.

A monitoring control method for a wireless communication device according to a fifth aspect of the present disclosure is a monitoring control method for a wireless communication device mountable on a mobile object. The monitoring control method includes a position information acquisition step for acquiring, position information on the wireless communication device; and a determination step for determining whether the wireless communication device is taken out for use outside the mobile object based on the acquired position information.

In the aspects described above, the present disclosure provides a satellite positioning module on a wireless communication device mountable on a mobile object and, based on the position information acquired by the satellite positioning unit, determines whether the wireless communication device mountable on the mobile object is taken out for use outside the vehicle, thus achieving monitoring control.

In addition, when it is determined that the wireless communication device mountable on a mobile object is taken out for use outside the vehicle, a countermeasure action pre-set by a car manufacture, for example, an action to reduce the communication speed or to inhibit the provision of the wireless network connection service, can be taken to prevent the user from improperly using the wireless communication device mountable on the mobile object.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Embodiments of the present disclosure are described in detail below with reference to the drawings.

Figure 1:
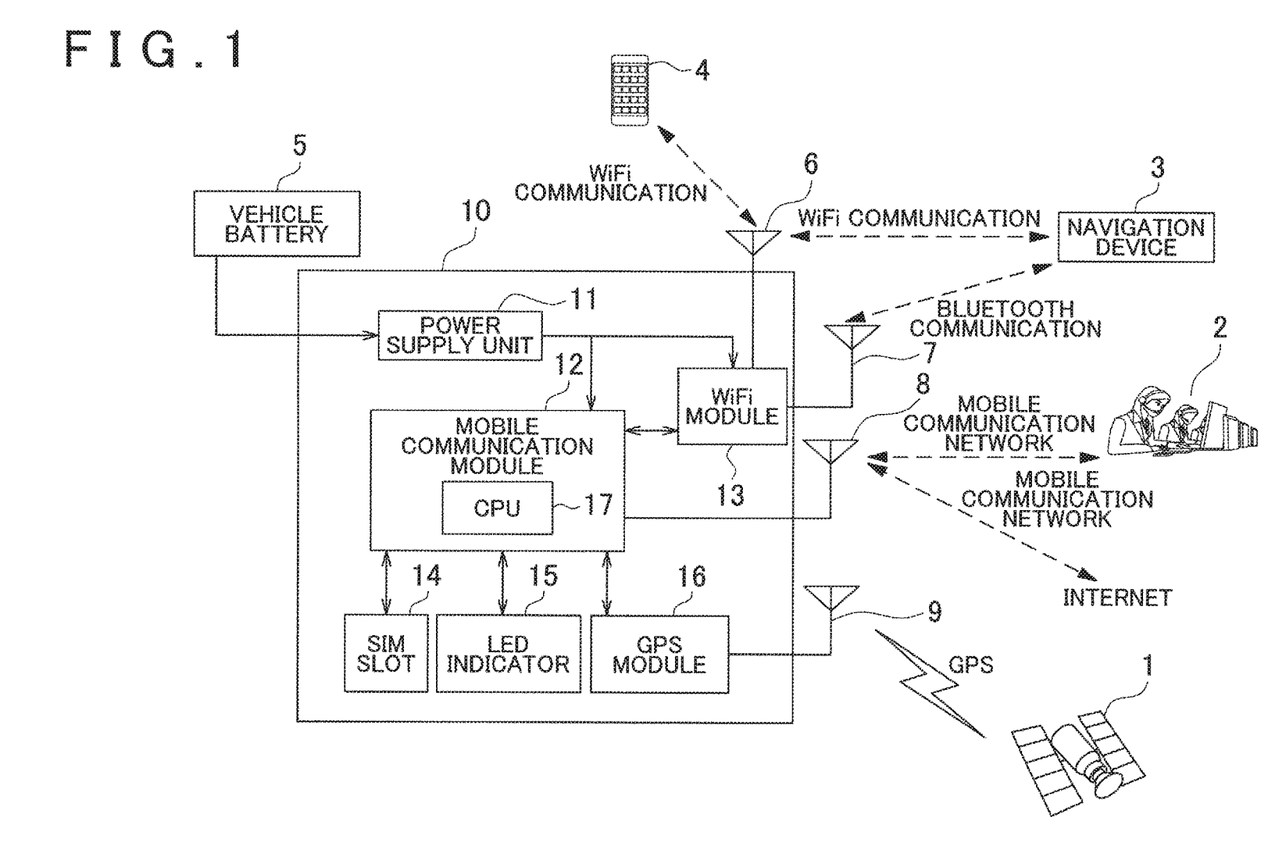
FIG. 1 is a block diagram showing a wireless communication device mountable on a mobile object according to the present disclosure.

FIG. 1 is a block diagram showing a wireless communication device mountable on a mobile object according to the present disclosure. A wireless communication device 10 according to the present disclosure, which may be configured as an in-vehicle WiFi box, includes a power supply unit 11, a mobile communication module 12 that is an example of a mobile communication unit, a WiFi module 13 that is an example of a wireless network connection unit an SIM slot 14, a LED indicator 15, and a GPS module 16 that is an example of a satellite positioning unit.

The power supply unit 11 receives an external power provided from outside the wireless communication device 10 and distributes the received power. For example, the power supply unit 11 distributes the power to the mobile communication module 12 and the WiFi module 13 of the wireless communication device 10. A vehicle battery 5 is the external power of the wireless communication device 10. When the vehicle ACC power is turned on, the vehicle battery 5 starts supplying power to the wireless communication device 10 and the wireless communication device 10 starts the operation.

The mobile communication module 12 provides the mobile communication network access service to allow mobile communication with a remote control center 2, or to allow access to the Internet, via a mobile communication antenna 8. The mobile communication module 12 is configured based on the mobile communication technology or the wireless communication technology such as 4G Long Term Evolution (LTE), Code Division Multiple Access (CDMA), Global System for Mobile Communications (GSM), or General Packet Radio Service (GPRS). Although the mobile communication module 12 shown in FIG. 1 includes a Central Processing Unit (CPU) 17, the CPU 17 need not necessarily be included in the mobile communication module 12 but may be provided outside the mobile communication module 12.

The WiFi module 13 provides the WiFi wireless network access service that covers the vehicle interior, based on the mobile communication network provided by the mobile communication module 12. That is, the wireless communication device in this embodiment has the function of a wireless router device. The WiFi module 13 and a mobile terminal 4, which is used by an occupant of the vehicle, carry out WiFi communication via a WiFi antenna 6. The mobile terminal 4 is, for example, a smartphone or a tablet PC. Although FIG. 1, a general block diagram, shows only one mobile terminal 4, there may be a plurality of mobile terminals 4 in an actual environment. In addition, the WiFi module 13 can carry out the WiFi communication not only with the mobile terminal 4 but also with other in-vehicle devices, which require the wireless network access service, via the WiFi antenna 6. An example of other in-vehicle devices that require the wireless network access service is a navigation device 3 of the vehicle. The other in-vehicle devices are not limited to the navigation device 3 but include a device, such as an in-vehicle multimedia system, that requires the wireless network access service. The WiFi module 13 shown in FIG. 1, composed of a collection of Bluetooth modules (not shown), can carry out the Bluetooth communication with the navigation device 3 via a Bluetooth antenna 7. That is, the navigation device 3 can carries out communication with the navigation device 3 in one of the two communication modes: WiFi communication for a relatively large amount of data (for example, download or update of a map) and Bluetooth communication for a relatively small amount of data (for example, voice data). It should be noted that, in the present disclosure, the Bluetooth modules are neither essential nor necessarily collected in the WiFi module 13.

WiFi, also spelled Wi-Fi or Wifi, is defined by the Wi-Fi Alliance as any wireless local area network product based on the Institute of Electrical and Electronics Engineers (IEEE) 802.11 standards. FIG 1 exemplarily shows the WiFi module 13 that provides the WiFi wireless network access service, but the present disclosure is not limited to this module. The WiFi module 13 may be replaced by any other wireless network access module that provides an equivalent wireless network access service. For example, the WiFi module 13 may be replaced by the WAPI module that provides the WAPI wireless network access service. WLAN Authentication and Privacy infrastructure (WAPI) is a Chinese National Standard for a wireless local area network. There is no limit on the number of types of wireless network access modules included in the wireless communication device 10. This means that a plurality of types of wireless network access modules may be included at the same time in the wireless communication device 10 to allow a plurality of types of wireless network access services to be provided. For example, one wireless communication device 10 may provide WiFi and WAPI wireless network access services at the same time.

The SIM slot 14 is a slot into which a SIM card, provided by a mobile network operator, is inserted. The LED indicator 15 indicates the operation state of the wireless communication device 10.

The GPS module 16 in the wireless communication device 10 acquires the position information on the wireless communication device 10 based on a GPS satellite positioning system 1 via a GPS antenna 9. When the wireless communication device 10 is located in the vehicle, the position information on the wireless communication device 10 acquired by the GPS module 16 corresponds basically to the vehicle's position information. When the wireless communication device 10 is taken out from the vehicle, the position information on the wireless communication device 10 acquired by the GPS module 16 does not correspond to the vehicle's position information. It is therefore desirable that the GPS module 16 in the wireless communication device 10 not be a module for vehicle navigation but be a module only for acquiring the position information, on the wireless communication device 10 so feat, based on this position information, it can he monitored and controlled whether the wireless communication device 10 is taken out from the vehicle. In other words, it is desirable that the GPS module 16 in the wireless communication device 10 be different from the GPS module (not shown) for use by the navigation device 3 of the vehicle. In other words, it is desirable that the navigation device 3 have its own GPS module (not described) for navigation.

The present disclosure may be based on any satellite positioning system. In the world, there are four major satellite-positioning systems—GPS (Global Positioning System) of USA, Galileo of European Community, GLONASS (GLObal NAvigation Satellite System) of Russia, and BDS (BeiDou Navigation Satellite System) of China. Although FIG. 1 exemplarily shows the GPS module 16 and the GPS satellite positioning system 1, the present disclosure is not limited to this combination of a module and a satellite positioning system. The implementation of the present disclosure does not depend on the type of a particular satellite positioning system.

The remote control center 2 is a remote control center such as the G-Book system of Toyota Motor Corporation and the OnStar system of General Motors. The mobile communication (4G LTE, CDMA, GSM, GPRS, etc.,) between a vehicle and the remote control center provides various services such as Navigation, theft prevention and vehicle tracking.

Although the mobile communication module 32, which is an example of the mobile communication unit, and the GPS module 16, which is an example of the satellite positioning unit, are exemplified as separate modules in this embodiment, the present disclosure is not limited to this configuration. For example, the part for connecting to the mobile communication network and the part for performing the function to acquire the position information based on the satellite positioning system may be implemented on one chip as a shared-memory structure in which the common memory is shared. In such a case, there is also a merit that the software program can be designed relatively easily.

The following describes the flow of the present disclosure with reference to the drawings. In the flow, the wireless communication device 10 is monitored and controlled based on the position information acquired by the GPS module 16.

Figure 2:
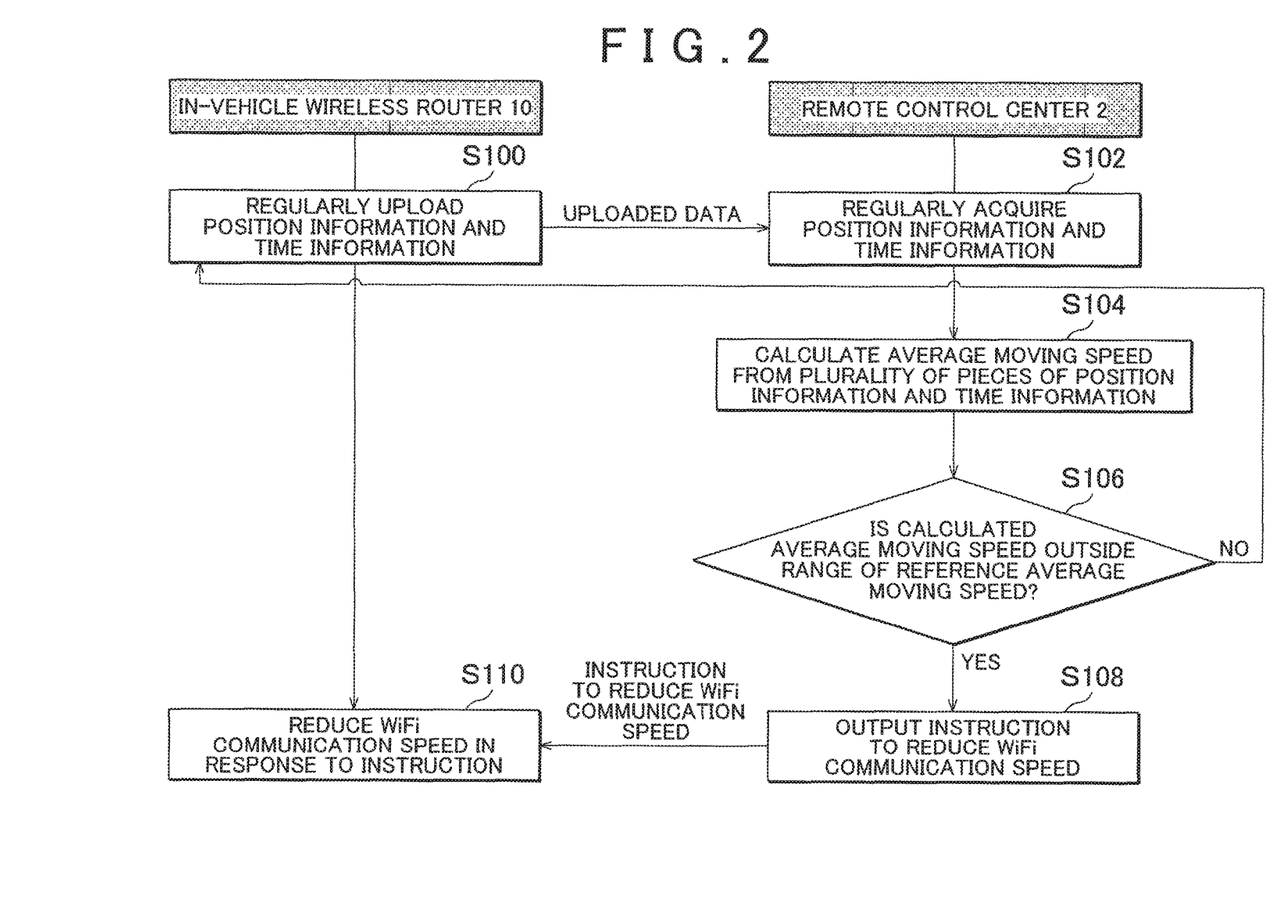
FIG. 2 is a flowchart showing a first embodiment.

FIG. 2 is a flowchart showing a first embodiment. As shown in FIG. 2, when the external power of the wireless communication device 10 is ON, the wireless communication device 10 regularly uploads (for example, once every six seconds) the position information, acquired by the GPS module 16, and the time information, related to the position information, to the remote control center 2 (step S100). In response, the remote control center 2 regularly acquires (for example, once every six seconds) the position information and the related time information uploaded by the wireless communication device 10 (step S102). The remote control center 2 calculates, the average moving speed of the wireless communication device 10 from the plurality of pieces of acquired position information and time information (step S104). For example, the remote control center 2 calculates the average moving speed once each time two pieces of position information are received. The remote control center 2 determines whether the calculated average moving speed is outside the range of the reference average moving speed (step S106). If it is determined that the calculated average moving speed is outside the range of the reference average moving speed (step S106: YES), the remote control center 2 determines that the wireless communication device 10 is taken out for use outside the vehicle. In this case, the remote control center 2 outputs an instruction to the wireless communication device 10 to reduce the WiFi communication speed. This instruction prevents the user from improperly using the wireless communication device 10 (step: S108). After receiving this instruction, the wireless communication device 10 reduces the WiFi communication speed (step S110). Conversely, if it is determined that the calculated average moving speed is within the range of the reference average moving speed (step S106: NO), the remote control center 2 determines that the wireless communication device 10 is used in the vehicle, that is, the wireless communication device 10 is used properly.

The principle of the determination condition in the first embodiment shown in FIG. 2 is as follows. Usually, the vehicle speed is within a reasonable reference range (for example, 120 km/h or lower). When the wireless communication device 10 is used in the vehicle, its moving speed is considered the same as the vehicle speed. Therefore, the calculated average moving speed is considered within this reference range. Conversely, when the calculated average moving speed is 250 km/h that is outside the reference range, there is a possibility that the wireless communication device 10 is taken out from the vehicle by the user and is used while traveling on a public transport system such as a high-speed railway.

In the first embodiment shown in FIG. 2, the determination condition is whether the calculated average moving speed is outside the range of the reference average moving speed. There is a modified embodiment of the determination condition of this embodiment. That is, in the modified embodiment, the determination condition is whether the calculated moving distance in a predetermined period of the wireless communication device 19 is outside the range of the reference moving distance. The modified embodiment that is based on the moving distance in a predetermined period is essentially equivalent to the first embodiment that is based on the average moving speed. This is because, when the average moving speed is within the range of the reference moving speed, the moving distance in a predetermined period is also considered within the range of the corresponding reference moving distance.

In addition, the first embodiment includes the following situation. That is, if the calculated average moving speed of the wireless communication device 10 remains zero for a predetermined period of time, more specifically, if the wireless communication device 10 is not in operation for a predetermined period of time and is in the stationary state but if the ON state of the external power continues and the position information and the time information are regularly uploaded, there is a possibility that the user, who once stopped the vehicle, has been using the WiFi Internet in the vehicle with the ACC power in the vehicle turned on. Generally speaking, however, it is thought that the user does not use the Internet continuously in a stationary vehicle for a very long time (for example, two days or longer). Therefore, if the state, in which the calculated average moving speed of the wireless communication device 10 remains zero, lasts longer than a predetermined period, of time (for example, two days), it is probable that the user has taken out the wireless communication device 10 for use at home. That is, the determination condition is satisfied in the first embodiment (or in the modified embodiment of the first embodiment) also if it is determined that the wireless communication device 10 is taken out for use outside the vehicle when the period of time during which the determination condition is satisfied reaches a predetermined time.

Figure 3:
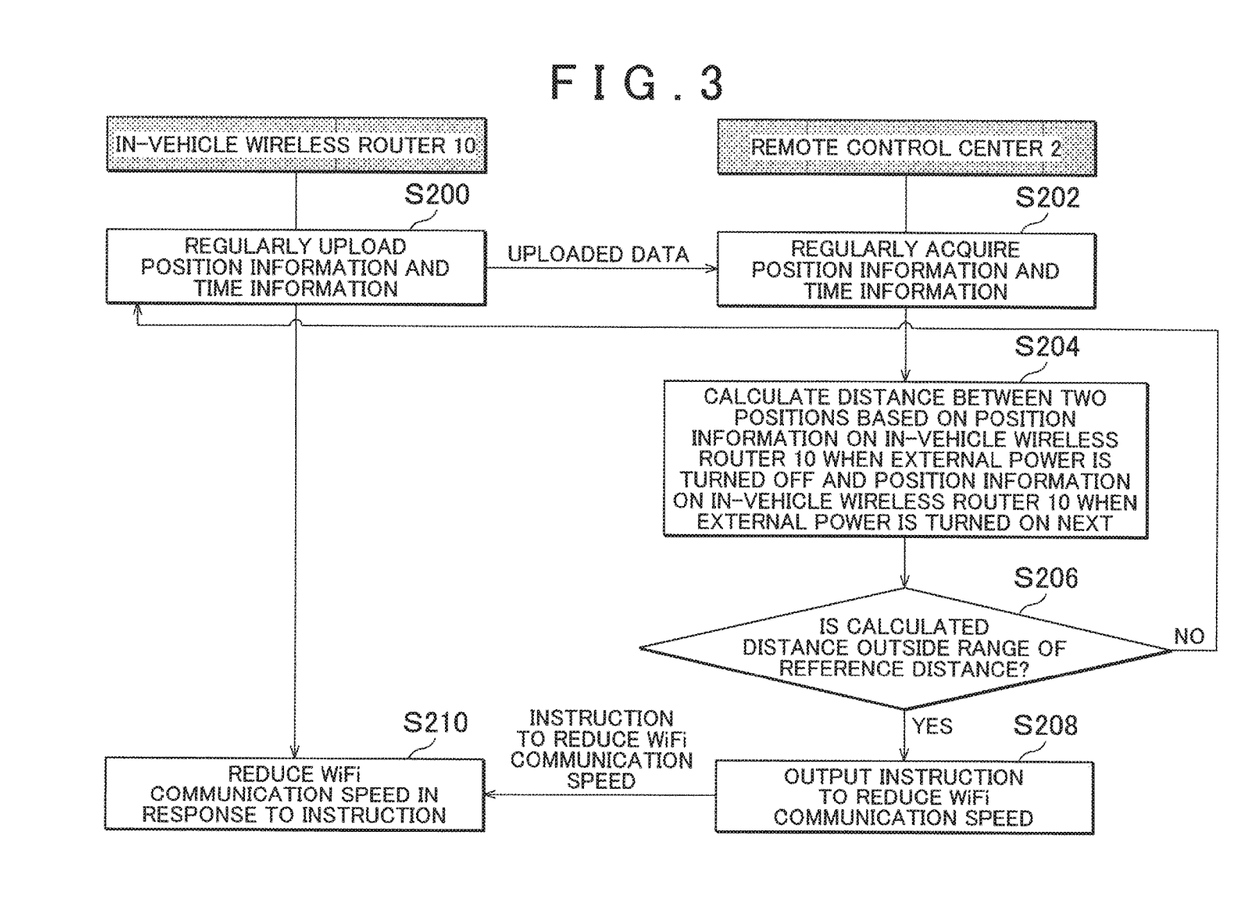
FIG. 3 is a flowchart showing a second embodiment.

FIG. 3 is a flowchart showing a second embodiment. As shown in FIG. 3, when the external power of the wireless communication device 10 is ON, the wireless communication device 10 regularly uploads (for example, once every six seconds) the position information, acquired by the GPS module 16, and the time information, related to the position information, to the remote control center 2 (step S200). In response, the remote control center 2 regularly acquires (for example, once every six seconds) the position information and the related time information uploaded by the wireless communication device 10 (step S202). The remote control center 2 can detect whether the external power of the wireless communication device 10 is turned off for a predetermined period of time and then turned on again, based on the plurality of pieces of acquired position information and time information. For example, if the external power of the wireless communication device 10 is continuously ON, the remote control center 2 regularly acquires (for example, once every six seconds) the position information on the wireless communication device 10 and the related time information (P0, t0), (P1, t1), . . . , (Pm, tm). In this case, the time interval between the neighboring data points is sis seconds. On the other hand, if data is interrupted (that is, data is not received from the wireless communication device 10) for a predetermined period of time (longer than six seconds, for example, 30 minutes) after the data point (Pm, tm) and, after that, the remote control center can continuously and regularly acquire (for example, once every six seconds) the position information on the wireless communication device 10 and the related time information (Pn, tn), (Pn+1, tn+1), (Pn+2, tn+2), . . . again, the remote control center 2 can estimate that, in this 30 minutes, the external power of the wireless communication device 10 is first turned off and then turned on again. In this case, based on the last position information acquired by the GPS module 16 when the external power of the wireless communication device 10 is turned off and the position information acquired by the GPS module 16 when the external power of the wireless communication device 10 is turned on next, the remote control center 2 calculates the distance between the two (step: S204). The remote control center 2 determines whether the calculated distance between the two is outside the range of the reference distance (step S206). If it is determined that the calculated distance is outside the range of the reference distance (step S206: YES), the remote control center 2 determines that the wireless communication device 10 is taken out for use outside the vehicle. In this case, the remote control center 2 sends an instruction to the wireless communication device 10 to reduce the WiFi communication speed. This instruction prevents the user from improperly using the wireless communication device 10 (step: S208). After receiving this instruction, the wireless communication device 10 reduces the WiFi communication speed (step S210). Conversely, if it is determined that the calculated distance is within the range of the reference distance (step S206: NO), the remote control center 2 determines that the wireless communication device 10 is used in the vehicle, that is, the wireless communication device 10 is used properly.

The principle of the determination condition in the second embodiment shown in FIG. 3 is as follows. If the wireless communication device 10 is used in the vehicle, the OFF state of the external power of the wireless communication device 10 usually corresponds to the OFF state of the ACC power of the vehicle. Similarly, the ON state of the external power of the wireless communication device 10 usually corresponds to the ON state of the ACC power of the vehicle. From the time the ACC power is turned off to the time the ACC power is turned on again, the vehicle is, in general, placed in the stationary state and the positions at the two times, turn-off time and turn-on time, are supposed to overlap with each other (in a special case, the distance between the vehicle's positions is within a reasonable range of the reference distance, for example, within the range of several meters). Therefore, if the wireless communication device 10 is used in the vehicle, the calculated distance between the position of the wireless communication device 10 when the external power is turned off and the position of the wireless communication device 10 when the external power is turned on next is considered within the range of the reference distance. Conversely, if the wireless communication device 10 is removed from the vehicle (in this case, the external power is turned off), is taken out for use at home (or other place), and is used by connecting it again to the external power at home (at this time, the supply of the external power is resumed), the distance between the positions indicated by the position information acquired by the GPS module 16 at these two different times is considered corresponding to the distance between the position of the vehicle when the wireless communication device 10 is removed and the position of the home (for example, several hundred meters). This distance exceeds a reasonable range of the reference distance.

Figure 4:
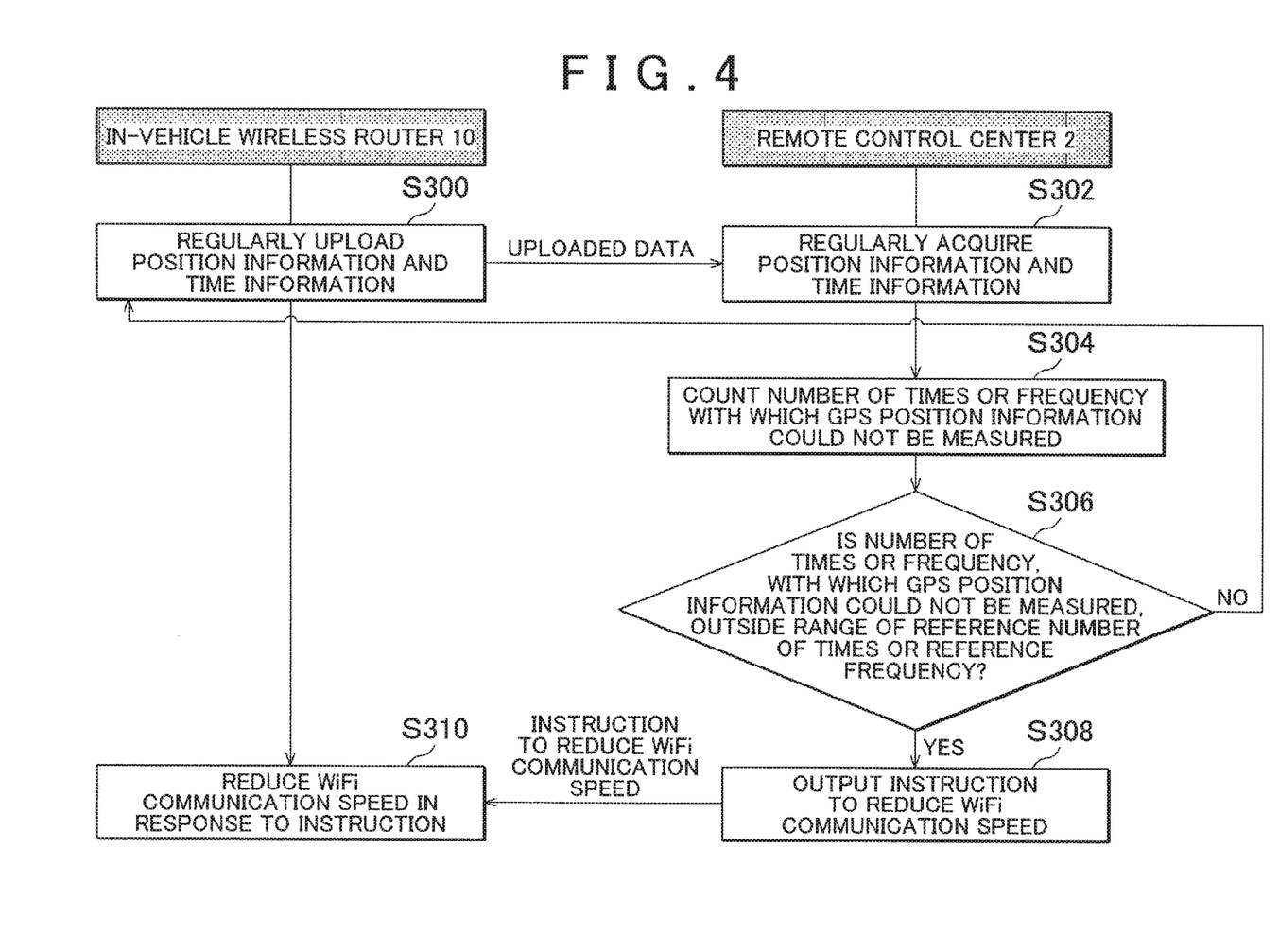
FIG. 4 is a flowchart showing a third embodiment.

FIG. 4 is a flowchart showing a third embodiment. As shown in FIG. 4, when the external power of the wireless communication device 10 is ON, the wireless communication device 10 regularly uploads (for example, once every six seconds) the position information, acquired by the GPS module 16, and the time information, related to the position information, to the remote control center 2 (step S300). In response, the remote control center 2 regularly acquires (for example, once every six seconds) the position information and the related time information uploaded by the wireless communication device 10 (step S302). The remote control center 2 counts the number of times or the frequency with which the GPS module 16 has felled to acquire the position information (that is, the GPS module 16 cannot measure the position information) that is indicated by the position information uploaded by the wireless communication device 10 (step S304). This determination condition is based on the premise that, though the GPS module 16 has failed to acquire the position information, the wireless communication device is connected to the mobile communication network by the mobile communication module 12 and the communication between the wireless communication device and the remote control center is established. That is, the wireless communication device 10 can notify the remote control center 2 that the position information, usually measured by the GPS module 16, cannot be acquired in the current operation. Instead, the wireless communication device 10 can notify the remote control center 2 about a base station ID. In this case, the remote control center can acquire brief position information on the mobile communication module 12 based on this base station ID using the base station positioning technology (usually, the accuracy of this position information is lower than that of the position information acquired by the GPS module 16). In this case, the brief position information (brief position information acquired using the base station positioning technology of the mobile communication module 12), though available, is not the position information acquired through measurement by the GPS module 16. Therefore, it is considered that the GPS module 16 has failed to acquire the position information. The remote control center 2 determines whether the counted number of times or frequency, with which the GPS module 16 has failed to acquire the position information, is outside the range of the reference number of times or the reference frequency (step S306). If it is determined that the counted number of times or frequency, with which the GPS module 16 has failed to acquire the position information, is outside the range of the reference number of times or the reference frequency (step S306: YES), the remote control center 2 determines that the wireless communication device 10 is taken out for use outside the vehicle. In this case, the remote control center 2 sends an instruction to the wireless communication device 10 to reduce the WiFi communication speed. This instruction prevents the user from improperly using the wireless communication device 10 (step: S308). After receiving this instruction, the wireless communication device 10 reduces the WiFi communication speed (step S310). Conversely if it is determined that the counted number of times or frequency, with which the GPS module 16 has failed to acquire the position information, is within the range of the reference number of times or the reference frequency (step S306: NO), the remote control center 2 determines that the wireless communication device 10 is used in the vehicle, that is, the wireless communication device 10 is used properly.

The principle of the determination condition in the third embodiment shown in FIG. 4 is as follows. While the user is using the wireless communication device 10 in the vehicle properly, it sometimes occurs that, in a particular situation (for example, the vehicle enters a tunnel or an underground car park), the GPS signal is interrupted hut the mobile communication is active. The number of times or the frequency with which the GPS position information cannot be measured in such a case is considered within the range of a reasonable reference number of times or frequency. For example, the travel time in a tunnel is short and, when the vehicle comes out of the tunnel, the GPS signal is recovered immediately. On the other hand, when the user takes out the wireless communication device 10 and uses it at home with the external power on, the GFS signal in the room remains interrupted (usually, the GPS signal in the room is not detected or very weak, while the mobile communication signal in the room is better than the GPS signal. That is, the mobile communication signal in the room is not interrupted). Therefore, the number of times or the frequency with which the GPS module 16 has failed to acquire the position information, far exceeds the range of the reference number of time or frequency described above. Therefore, in such a case, it can he determined that the user has taken out the wireless communication device 10 tor use outside the vehicle.

Figure 5A:
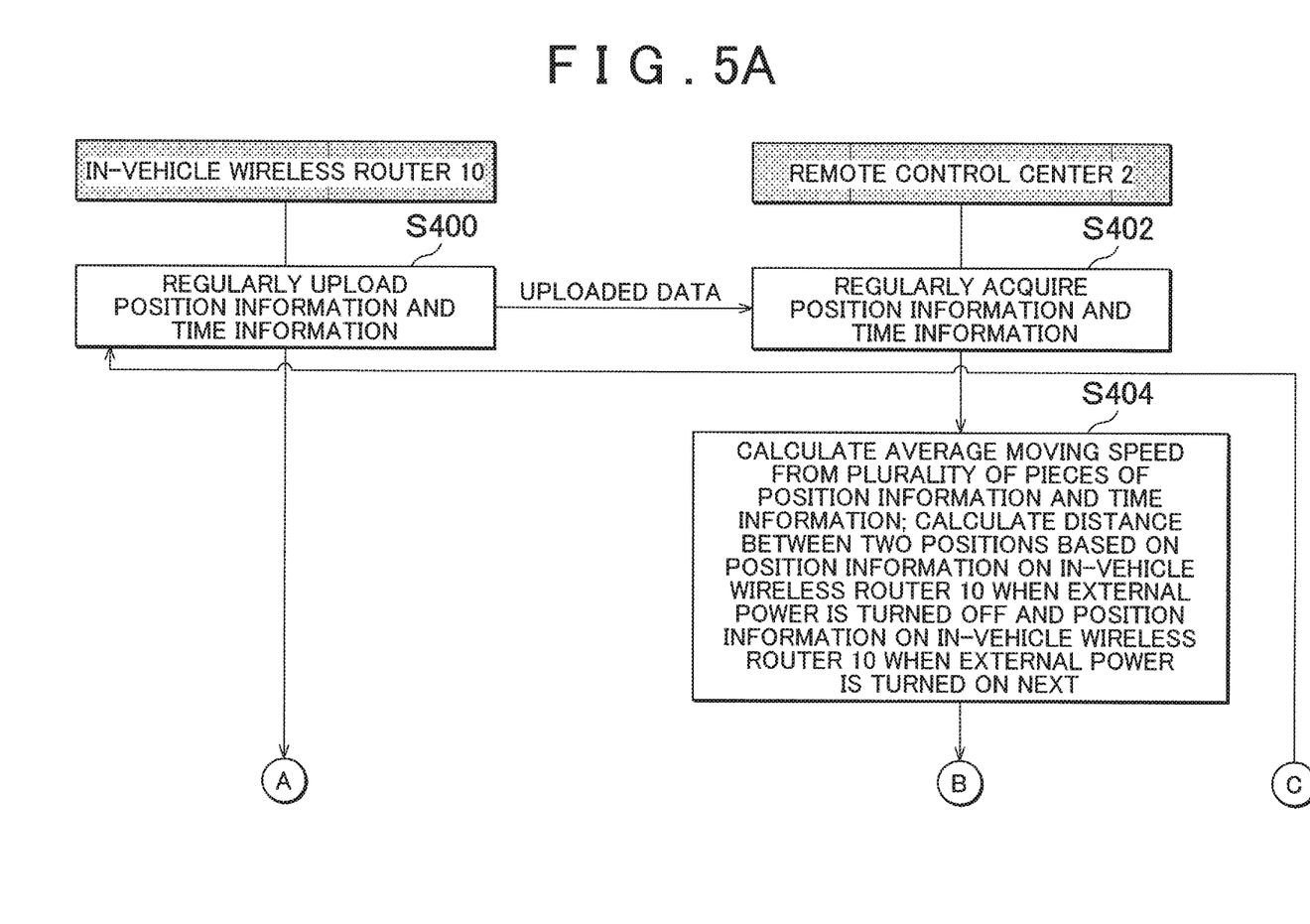
FIG. 5A is a flowchart showing a fourth embodiment.
Figure 5B:
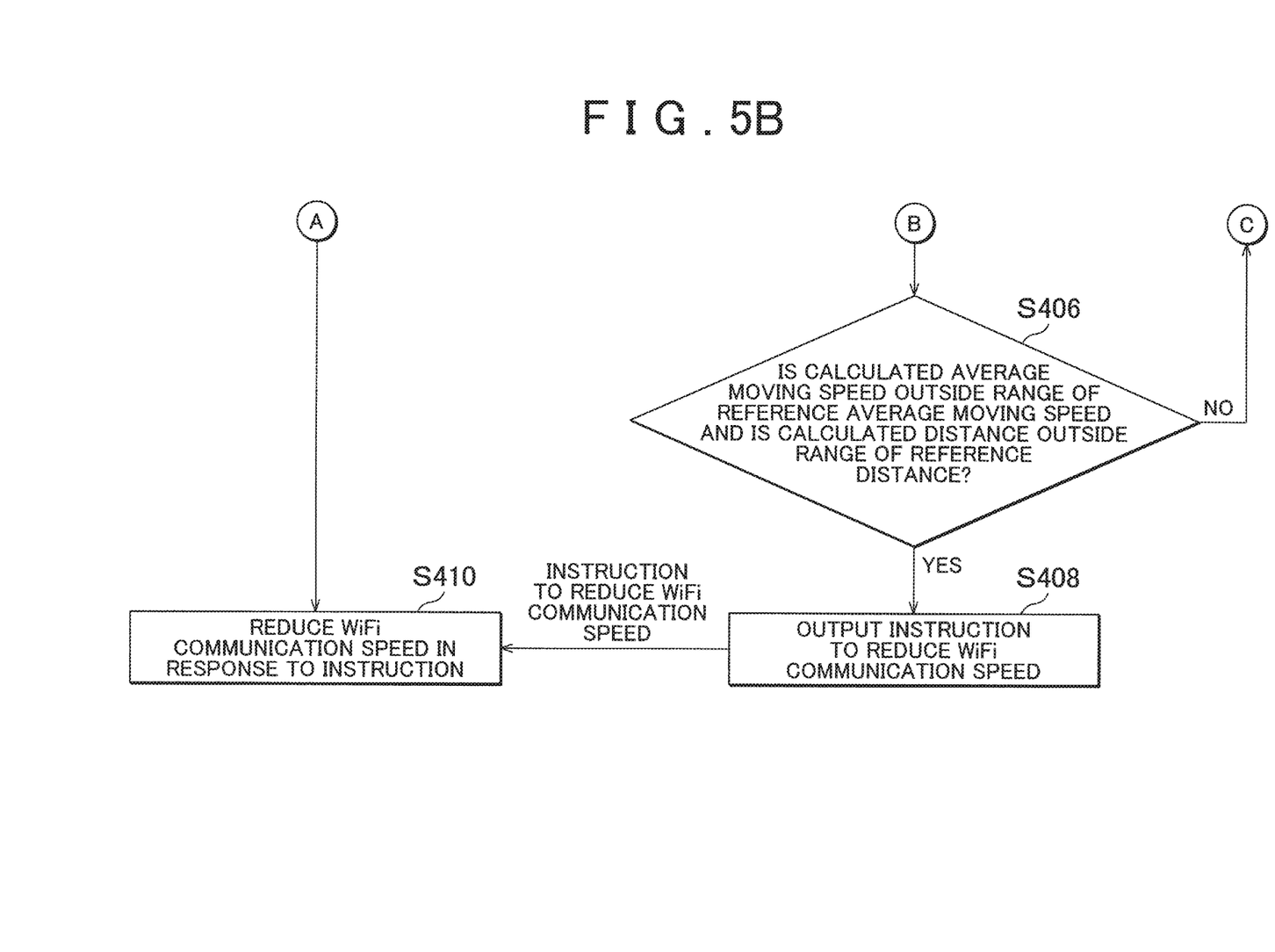
FIG. 5B is a continuation of the flowchart of FIG. 5A.

FIGS. 5A and 5B Illustrate a flowchart showing a fourth embodiment. The fourth embodiment, shown in FIGS. 5A and 5B, uses a determination condition that is a combination of the condition in the first embodiment and the condition in the second embodiment. That is, the remote control center 2 calculates the average moving speed from a plurality of pieces of position information and time information in step S404 as shown in FIG. 5A. After that, based on the position information on the wireless communication device 10 when the external power is turned off and the position information on the Wireless communication device 10 when the external power is turned on next, the remote control center 2 calculates the distance between the two positions. In the fourth embodiment, the remote control center 2 must determine whether the combination of the condition in the first embodiment and the condition in the second embodiment is satisfied (that is, both conditions must be satisfied). That is, the remote control center 2 determines whether the calculated average moving speed is outside the range of the reference average moving speed and whether the calculated distance is outside the range of the reference distance (step S406) as shown in FIG. 5B. The other steps in the fourth embodiment shown in FIGS. 5A and 5B are similar to those in the first and second embodiments and, therefore, their description is omitted.

The principle of the determination condition in the fourth embodiment, shown in FIGS. 5A and 5B, is as follows. Using the combination of the condition in the first embodiment and the condition in the second embodiment as the determination condition increases determination accuracy and reduces determination mistakes.

Figure 6A:
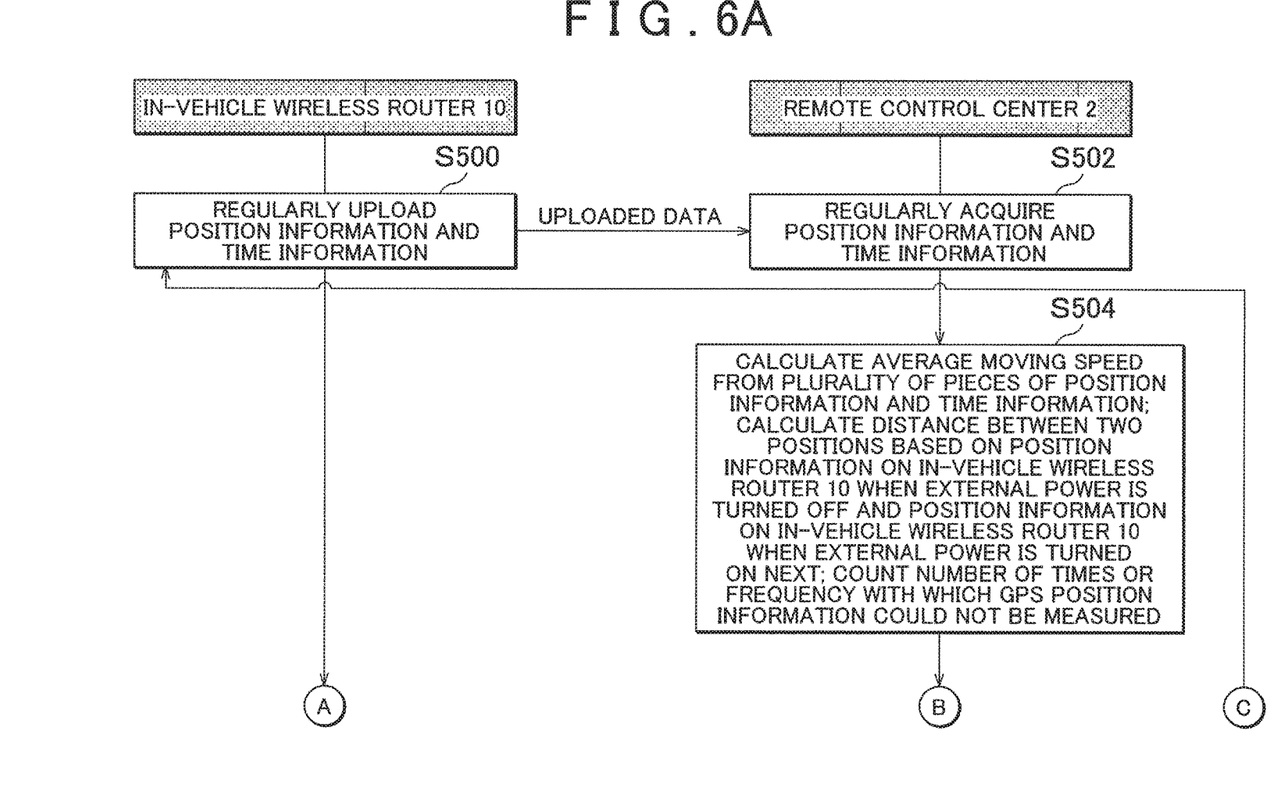
FIG. 6A is a flowchart showing a fifth embodiment.
Figure 6B:
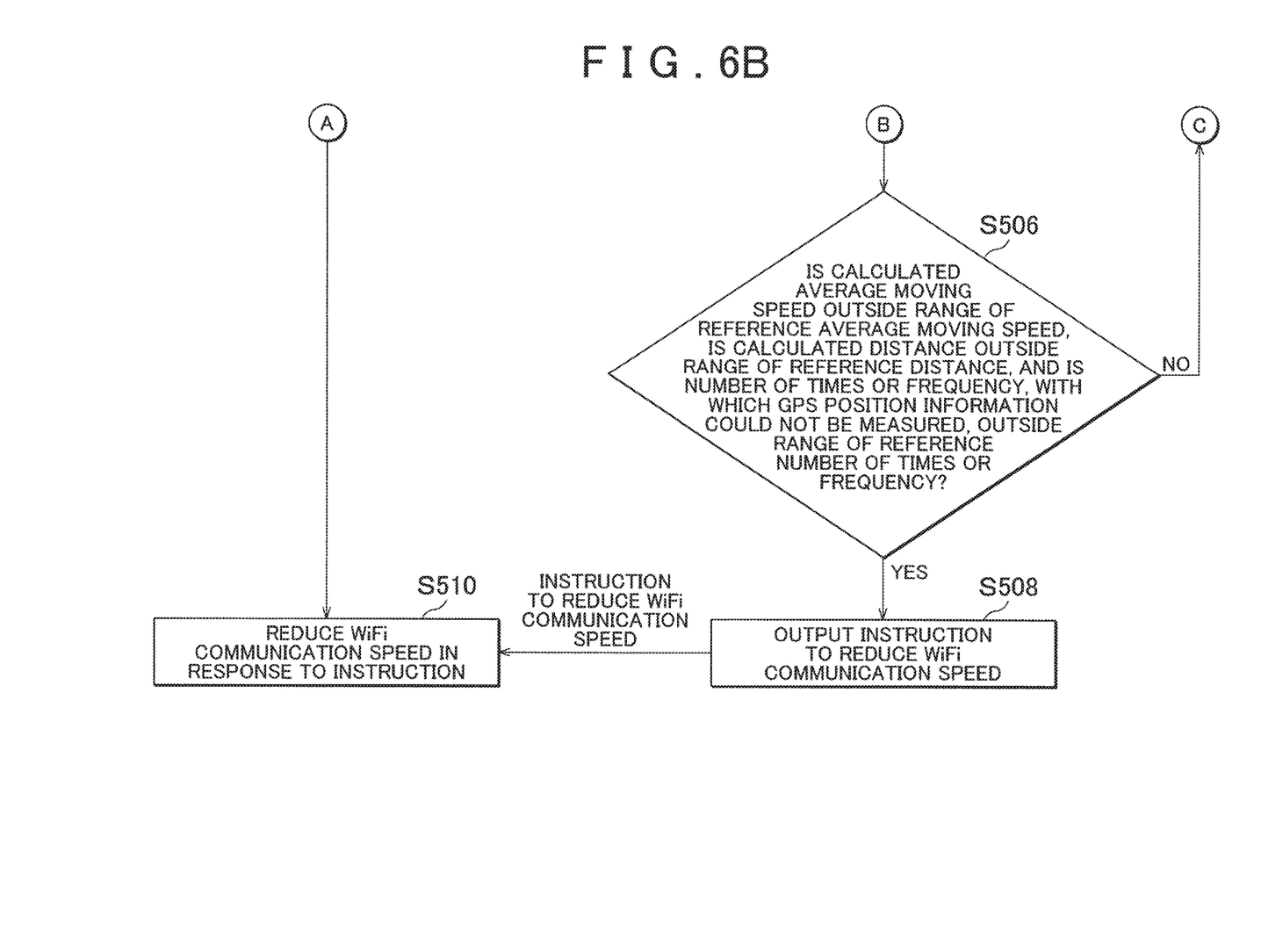
FIG. 6B is a continuation of the flowchart of FIG. 6A.

FIGS. 6A and 6B illustrate a flowchart showing a fifth embodiment. The fifth embodiment, shown in FIGS. 6A and 6B, uses a determination condition that is a combination of the condition in the first embodiment, the condition in the second embodiment, and the condition in the third embodiment. That is, the remote control center 2 calculates the average moving speed from a plurality of pieces of position information and time information in step S504 as shown in FIG. 6A. After that, based on the position information on the wireless communication device 10 when the external power is turned off and the position information op the wireless communication device 10 when the external power is turned on next, the remote control center 2 calculates the distance between the two positions. After that, the remote control center 2 counts the number of times or frequency with which the GPS position information could not be measured. In the fifth embodiment, the remote control center 2 must determine whether the combination of the condition in the first embodiment, the condition in the second embodiment, and the condition in the third embodiment is satisfied (that is, all tree conditions must be satisfied). That is, the remote control center 2 determines whether the calculated average moving speed is outside the range of the reference average moving speed, whether the calculated distance is outside the range of the reference distance, and whether the number of times or frequency, with which the GPS position information could not be measured, is outside the range of the reference number of times or the reference frequency (step S506) as shown in FIG. 6B. The other steps in the fifth embodiment shown in FIGS. 6A and 6B are similar to those in the first, second, and third embodiments and, therefore, their description k omitted.

The principle of the determination condition in the fifth embodiment, shown in FIGS. 6A and 6B, is as follows. Using the combination of the condition in the first embodiment, the condition in the second embodiment, and the condition in the third embodiment as the determination condition increases determination accuracy and reduces determination mistakes.

Figure 7:
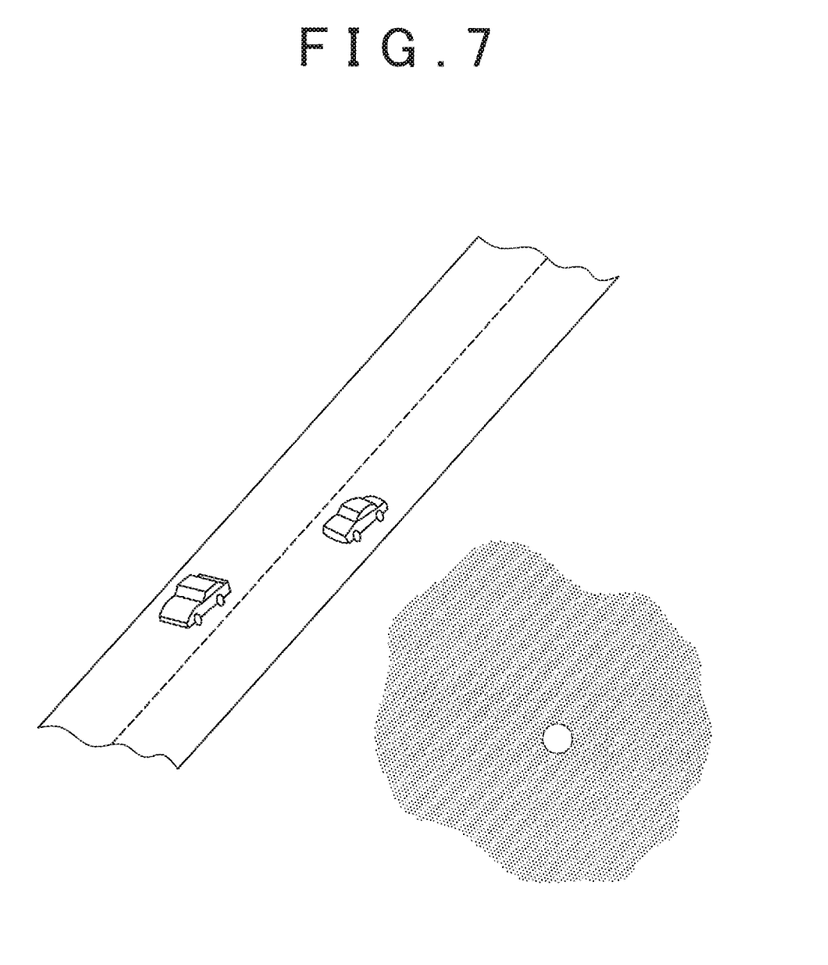
FIG. 7 is a general diagram showing a sixth embodiment.

FIG. 7 is a general diagram showing a sixth embodiment. According to the sixth embodiment, the remote control center 2 can determine whether the wireless communication device 10 is taken out for use outside the vehicle based on whether the position information on the wireless communication device 10 indicates a location where the vehicle cannot usually reach. For example, as shown in FIG. 7, if the position information on the wireless communication device 10 indicates that the wireless communication device 10 is at a particular position such as a lake or a sea, there is a possibility that the wireless communication device 10 is taken out for use on board. This is because a car does not usually appear in such a particular position.

The embodiments described above are preferred embodiments of the present disclosure but do not limit the present disclosure. For example, the combination of the conditions of the first to third embodiments is not limited to the combinations described in the fourth embodiment and the fifth embodiments but these conditions can be combined also with the condition of the sixth embodiment. Satisfying a condition may refer to a situation in which the condition is satisfied for a predetermined time. When a plurality of conditions is combined, the order in which the conditions are satisfied need not be determined. It is apparent to those skilled in the art that the conditions in the above embodiments are exemplary only.

The instruction issued in the above embodiments to reduce the WiFi communication speed is also exemplary only. For example, the instruction may be changed or modified to an Instruction that inhibits the WiFi service.

Although the regular uploading of the position information and the related time information is described by way of example in the above embodiments, it is apparent to those skilled in the art that the uploaded data need not necessarily include the related time information. This is because the remote control center 2, which receives the time of the position information, can determine the related time information.

In addition, though the above embodiments describe, by way of example, that the remote control center 2 determines whether the wireless communication device 10 is taken out for use outside the vehicle, the present disclosure is not limited to this type of determination. Instead, without intervention from the remote control center 2, the wireless communication device 10 itself can determine whether the wireless communication device 10 is taken out for use outside the vehicle. In this case, the wireless communication device further includes a wireless-communication-device-side database and a wireless-communication-device-side determination unit. The wireless-communication-device-side database stores the position information that is acquired by the GPS module and the time information that indicates the time at which the position information is acquired. The wireless-communication-device-side determination unit determines whether this wireless communication device is taken out for use outside the vehicle, based on the position information and the time information stored in the database. The wireless communication device in this case is configured to determine that the wireless communication device is taken out for use outside the vehicle if any of the determination conditions described in the first embodiment to the sixth embodiment is satisfied. This simple configuration, configured simply by the wireless communication device, can monitor and control whether the wireless communication device is taken out for use outside the vehicle.

Although the above embodiments describe by way of example that the wireless communication device 10 controls the connection state of the wireless network connection service, provided by the wireless communication device according to the present disclosure, based on the determination result of the center-side determination unit or the wireless-communication-device-side determination unit, the present disclosure is not limited to this configuration. Instead of controlling the connection state of the wireless network connection service, it is also possible to provide the user with the information that is output by one of the determination units described above and that notifies the determination result indicating whether the wireless communication device is taken out from the mobile object.

In this case, the wireless communication device includes a warning lamp and a lighting control unit. The warning lamp works as an information providing unit that provides information to the user. The lighting control unit controls the lighting of the warning lamp when one of the determination units described above determines that the wireless communication device is taken out for use outside the mobile object. The lighting control unit may be executed as one of the functions of the CPU in the mobile communication module or may be provided as a separate unit. For example, the lighting control unit is configured to control the lighting of the lamp in such a manner that the single-color lamp remains on if it is not determined that the wireless communication device is taken out for use outside the mobile object arid that the lamp blinks if it is determined that the wireless communication device is taken out for use outside the mobile object. This alerts the user to refrain from taking out the wireless communication device for use outside the vehicle.

The warning lamp may be integrated into the LED indicator 15 of the wireless communication device 10. In addition, the information providing unit is not limited to a warning lamp. For example, if the center-side determination unit determines that the wireless communication device is taken out for use outside the mobile object, it is also possible to reference the user information registered in advance and to send an alert directly from the remote control center to the user via phone or mail.

It Is apparent to those skilled in the art that various modifications and changes may be added to the embodiments of the present disclosure without departing from the spirit and the scope of the present disclosure. Therefore, the changes and modifications included in the scope of the present disclosure restricted by claims are all included in the present disclosure.

The invention claimed is:

1. A wireless communication device mounted on a mobile object, comprising:
 a mobile communication unit configured to connect to a mobile communication network;
 a wireless network connection unit configured to provide a wireless network connection service based on the mobile communication network connected by the mobile communication unit;
 a satellite positioning unit configured to acquire position information on the wireless communication device based on a satellite positioning system; and
 a control unit configured to control a connection state of the wireless network connection service based on a determination result as to whether an average moving speed of the wireless communication device is outside a range of a reference average moving speed, the average moving speed being calculated based on a plurality of pieces of position information acquired by the satellite positioning unit and a plurality of pieces of related time information.

2. The wireless communication device according to claim 1, wherein the control unit configured to reduce the connection state of the wireless network connection service as compared to a case in which it is not determined that the average moving speed of the wireless communication device is outside the range of the reference average moving speed.

3. The wireless communication device according to claim 2, wherein the connection state of the wireless network connection service is reduced by reducing a state of connection to the mobile communication network.

4. The wireless communication device according to claim 3, wherein the state of connection to the mobile communication network is reduced either by reducing a communication speed of the mobile communication network or by stopping the connection to the mobile communication network.

5. The wireless communication device according to claim 2, wherein the connection state of the wireless network connection service is reduced either by reducing a strength of a radio signal issued by the wireless network connection unit or by stopping the issuance of the wave signal.

6. The wireless communication device according to claim 2, wherein the control unit is a central processing unit.

7. The wireless communication device according to claim 1, wherein the control unit is a central processing unit.

8. A remote control center that is able to communicate with a wireless communication device mountable on a mobile object, the remote control center comprising:
 a receiving unit configured to receive position information on the wireless communication device sent from the wireless communication device;
 a control unit configured to determine whether an average moving speed of the wireless communication device is outside a range of a reference average moving speed, the average moving speed being calculated based on a plurality of pieces of position information acquired by a satellite positioning unit of the wireless communication device and a plurality of pieces of related time information; and
 a sending unit configured to send a signal according to a determination result of the control unit to the wireless communication device.

9. The remote control center according to claim 8, wherein the control unit is a central processing unit.

* * * * *

UNITED STATES PATENT AND TRADEMARK OFFICE
CERTIFICATE OF CORRECTION

PATENT NO. : 10,225,693 B2
APPLICATION NO. : 15/826130
DATED : March 5, 2019
INVENTOR(S) : Tomoki Kodan et al.

It is certified that error appears in the above-identified patent and that said Letters Patent is hereby corrected as shown below:

In the Specification

In Column 1, Line 23, delete "mere" and insert --more--, therefor.

In Column 1, Line 50, delete "Applet's" and insert --Apple's--, therefor.

In Column 2, Line 08, delete "he used" and insert --be used--, therefor.

In Column 3, Line 67, delete "unit an" and insert --unit, an--, therefor.

In Column 5, Line 35, delete "position information," and insert --position information--, therefor.

In Column 5, Line 36, delete "so feat" and insert --so that--, therefor.

In Column 7, Line 57, delete "sis" and insert --six--, therefor.

In Column 9, Line 7, delete "felled" and insert --failed--, therefor.

In Column 9, Line 65, delete "hut" and insert --but--, therefor.

In Column 10, Line 17, delete "tor" and insert --for--, therefor.

In Column 10, Line 60, delete "op" and insert --on--, therefor.

In Column 11, Line 14, delete "k omitted" and insert --is omitted--, therefor.

In Column 12, Line 50, delete "arid" and insert --and--, therefor.

Signed and Sealed this
Thirteenth Day of August, 2019

Andrei Iancu
*Director of the United States Patent and Trademark Office*